D. DAVENPORT.
Making Confectionery.
No. 67,848. Patented Aug. 20, 1867.
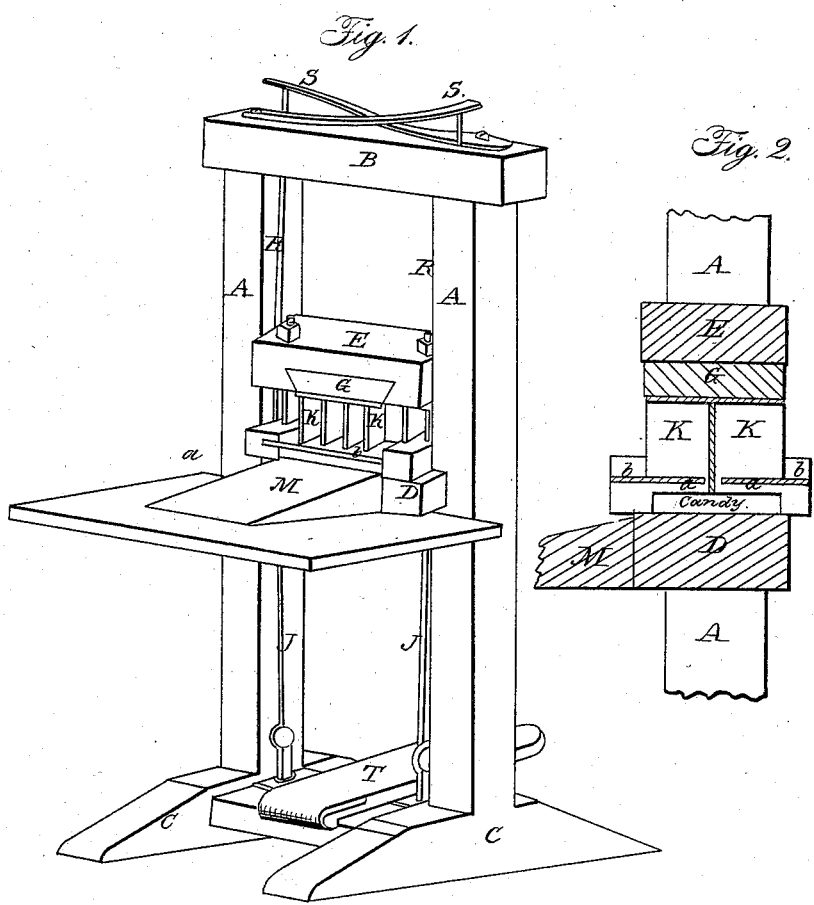

United States Patent Office.

DAVID DAVENPORT, OF ALBANY, NEW YORK, ASSIGNOR TO HENRY C. WILKINS, OF THE SAME PLACE.

Letters Patent No. 67,848, dated August 20, 1867.

CORN-CANDY CUTTER.

The Schedule referred to in these Letters Patent and making part of the same.

Be it known that I, DAVID DAVENPORT, of the city of Albany, State of New York, have invented a new and useful Machine for Service in the Manufacture of Corn-Candy Cakes; and I do declare the following specification, with the drawings forming part thereof, to be a full and complete description of my invention.

Figure 1 is a perspective view of the machine.

Figure 2 is a central vertical section of the same.

Figure 3 is a perspective view of the cutter.

Similar letters denote the same parts of the apparatus.

The machine is constructed of two upright posts, A A, connected at top by a cross-beam, B, and resting at bottom upon two feet, C C. Between the posts A a cross-beam, D, is secured to them. At a short distance above D there is another beam, E, movable upwards and downwards between the posts. Attached to the lower side of this beam there is a cutter, consisting of a set of knives, K, shaped and arranged as shown in fig. 3, which represents them in perspective, turned in reverse obliquely upwards; four ranging from the front to rear parallel with each other, and divided through their centre by a blade stretching across the machine and extending beyond the outermost of the other blades, so as to divide anything subjected to them into ten sections, of equal size. These cutters are attached to a block, G, fitting into the beam so as to be easily removed when desired.

The object of this cutter is to divide a mass of corn candy into cakes of a given size. The candy, which is formed into thin slabs by shallow rectangular pans, is placed under the cutter within a recess or box, $a$, on the top of the beam D, its sides being formed by blocks supporting, at a distance equal to the thickness of the candy, a metal plate, $b$, pierced with slots to allow the passage of the blades of the cutter. The beam E, with the cutter, is kept raised above the plate by springs S S, placed on the top of the beam B, and connected with it by rods R R, or may be operated by any other convenient arrangement of springs. From the lower side of the beam, rods J J connect it with a treadle, T, attached to the base of the frame, by means of which beam E can be drawn downwards. M is a sloping table, upon which the cakes are projected when completed.

The operation of the machine is this: The operator places the candy slab within the recess $a$, and then by a smart pressure upon the treadle brings the cutter down through the mass, severing it into ten cakes.

I do not limit myself to the division into ten cakes, but propose to make the cutter with any number of knives and any arrangement of them to cut into any required number of cakes of any desired size or form, and to make the recess $a$ below it to receive any corresponding size of slab of candy.

What I claim as my invention, and desire to secure by Letters Patent, is—

I claim the traversing-block E, carrying the knives K K, crossing each other and operated by the spring S S and treadle T, to cut the cakes of candy entirely across in each direction at one operation.

The combination of the subject-matter of the above claim with the slotted plate $b$ and the recess $a$ beneath it, as described.

D. DAVENPORT.

Witnesses:
RICHD. VARICK DE WITT,
D. W. DE WITT.